United States Patent
Chavez

(10) Patent No.: US 9,748,891 B2
(45) Date of Patent: Aug. 29, 2017

(54) SUPPORT ASSEMBLY FOR SUPPORTING A SOLAR PANEL

(71) Applicant: Preformed Line Products, Mayfield Village, OH (US)

(72) Inventor: Robert Chavez, Albuquerque, NM (US)

(73) Assignee: PREFORMED LINE PRODUCTS, Mayfield Village, OH (US)

( * ) Notice: Subject to any disclaimer, the term of this patent is extended or adjusted under 35 U.S.C. 154(b) by 69 days.

(21) Appl. No.: 14/948,904

(22) Filed: Nov. 23, 2015

(65) Prior Publication Data
US 2016/0149535 A1    May 26, 2016

Related U.S. Application Data

(60) Provisional application No. 62/083,547, filed on Nov. 24, 2014.

(51) Int. Cl.
*A47F 5/00* (2006.01)
*H02S 20/00* (2014.01)

(52) U.S. Cl.
CPC .............. *H02S 20/00* (2013.01); *Y02E 10/50* (2013.01)

(58) Field of Classification Search
CPC ................................. H02S 20/00; Y02E 10/50
USPC .................. 248/148, 237, 300; 136/251, 259
See application file for complete search history.

(56) References Cited

U.S. PATENT DOCUMENTS

| | | | | |
|---|---|---|---|---|
| 8,061,091 B2* | 11/2011 | Botkin | ................... | F24J 2/5211 126/623 |
| 2010/0243023 A1* | 9/2010 | Patton | ................... | F24J 2/4607 136/244 |
| 2010/0288337 A1* | 11/2010 | Rizzo | ..................... | F24J 2/5239 136/251 |
| 2012/0312357 A1* | 12/2012 | Sagayama | ................ | F24J 2/523 136/251 |
| 2014/0060626 A1* | 3/2014 | Stephan | .................. | H02S 20/24 136/251 |

* cited by examiner

*Primary Examiner* — Gwendolyn Baxter
(74) *Attorney, Agent, or Firm* — Cooper Legal Group, LLC

(57) ABSTRACT

A support assembly supports a solar panel. The support assembly includes a first support portion including a first base wall. A first lateral wall is attached to the first base wall and includes a first attachment structure. A second support portion is attached to the first support portion such that the first support portion and the second support portion support the solar panel. The second support portion includes a second base wall. The second base wall is attached to the first base wall of the first support portion. A first attachment wall is attached to the second base wall. The first attachment wall defines a first attachment opening into which the first attachment structure of the first lateral wall is received such that the first attachment wall is attached to the first lateral wall. A method of forming a support assembly for supporting a solar panel is provided.

20 Claims, 10 Drawing Sheets

SUPPORT ASSEMBLY FOR SUPPORTING A SOLAR PANEL

CROSS-REFERENCE TO RELATED APPLICATIONS

This application claims priority to U.S. Provisional Patent Application No. 62/083,547, titled "SUPPORT ASSEMBLY FOR SUPPORTING A SOLAR PANEL", filed on Nov. 24, 2014, the entire disclosure of which is hereby incorporated by reference.

TECHNICAL FIELD

The instant application is generally directed towards a support assembly for supporting a solar panel.

BACKGROUND

A support assembly can support a solar panel. The solar panel can use light energy to generate electricity.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a support assembly is configured to support a solar panel. The support assembly comprises a first support portion comprising a first base wall lying within a first base plane and a first lateral wall attached to the first base wall. The first lateral wall lies within a first lateral plane that is non-planar with respect to the first base plane. The first lateral wall comprises a first attachment structure that lies within a first attachment structure plane that is non-planar with respect to the first lateral plane and the first base plane. The support assembly comprises a second support portion attached to the first support portion such that the first support portion and the second support portion support the solar panel. The second support portion comprises a second base wall lying within a second base plane, the second base wall attached to the first base wall of the first support portion. A first attachment wall is attached to the second base wall. The first attachment wall lies within a first attachment wall plane that is non-planar with respect to the second base plane. The first attachment wall defines a first attachment opening into which the first attachment structure of the first lateral wall is received such that the first attachment wall is attached to the first lateral wall.

In an example, a support assembly is configured to support a solar panel. The support assembly comprises a first support portion comprising a first base wall and a first lateral wall attached to the first base wall. The first lateral wall lies within a first lateral plane and comprises a first attachment structure that projects outwardly from the first lateral wall. A first end of the first attachment structure is attached to the first lateral wall. A second end of the first attachment structure is not attached to the first lateral wall. The second end of the first attachment structure is spaced a distance from the first lateral wall along a direction that is substantially perpendicular to the first lateral plane. A second support portion is attached to the first support portion such that the first support portion and the second support portion support the solar panel. The second support portion comprises a second base wall attached to the first base wall of the first support portion. The second support portion comprises a first attachment wall attached to the second base wall. The first attachment wall defines a first attachment opening into which the second end of the first attachment structure of the first lateral wall is received such that the first attachment wall is attached to the first lateral wall.

In an example, a method of forming a support assembly for supporting a solar panel is provided. The method comprises bending a first attachment structure of a first lateral wall from a first position, in which the first attachment structure lies within a first lateral plane, to a second position, in which the first attachment structure lies within a first attachment structure plane. The first lateral plane is non-planar with respect to the first attachment structure plane. The method comprises attaching the first lateral wall to a first attachment wall by altering a relative position between the first lateral wall and the first attachment wall, which defines a first attachment opening, such that the first attachment structure in the second position is received within the first attachment opening. The first lateral wall and the first attachment wall, when attached, support the solar panel.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
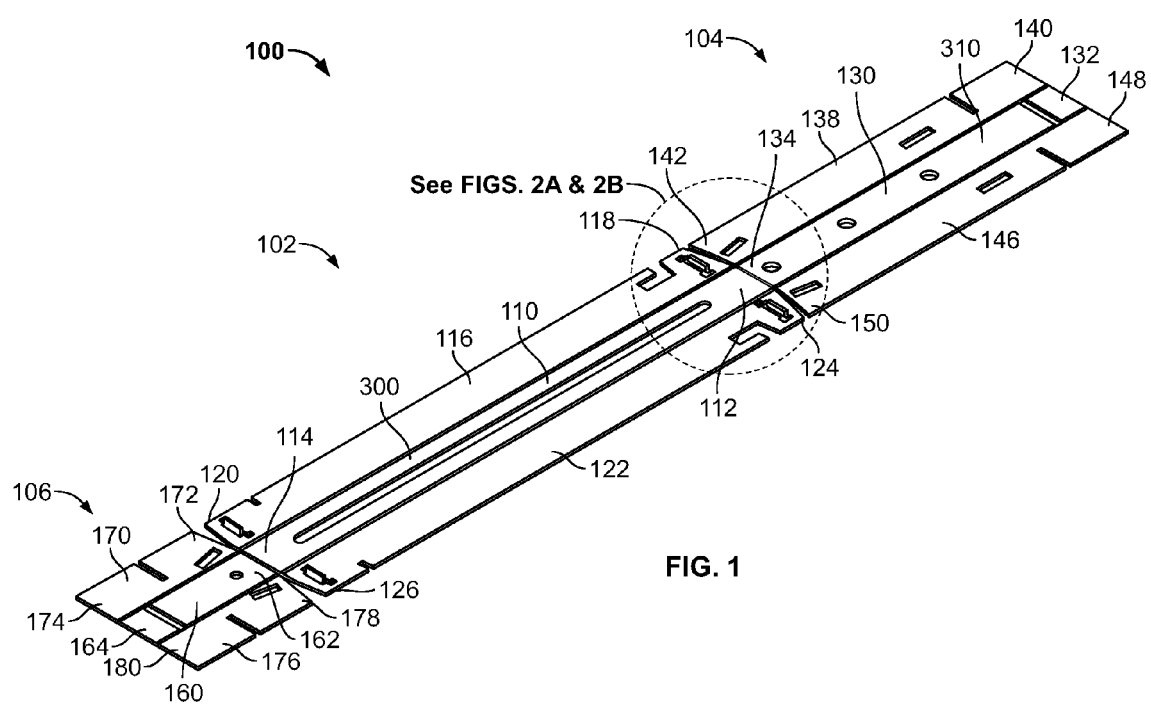
FIG. 1 illustrates an example support assembly.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. At least some dimensions in the drawing may not be to scale.

FIG. 1 illustrates an example support assembly 100. The support assembly 100 is configured to support a solar panel (e.g., illustrated in FIG. 7). The example support assembly 100 of FIG. 1 is illustrated in a pre-assembled state. In operation, the support assembly 100 can be assembled/constructed so as to support the solar panel. In general, the solar panel can use light energy to generate/produce electricity. The support assembly 100 comprises any number of materials, such as metal materials (e.g., stainless steel, etc.), non-metal materials (e.g., plastics, etc.), composite materials (e.g., combinations of metal(s) and/or non-metal(s)), etc. In the illustrated examples, the support assembly 100 comprises a material that has at least some degree of rigidity and structural integrity so as to support a load (e.g., one or more solar panels) with a resistance to inadvertent breaking, bending, flexing, etc.

The support assembly 100 comprises a first support portion 102, a second support portion 104, and a third support portion 106. The first support portion 102 comprises a first base wall 110. The first base wall 110 is an elongated, substantially planar structure that extends between a first end 112 and a second end 114. In some examples, the first base wall 110 comprises one or more openings, projections, or the like to facilitate attachment of the first base wall 110 to another structure. For example, the first base wall 110 may comprise openings (e.g., threaded openings) for receiving one or more screws.

The first support portion 102 comprises a first lateral wall 116. The first lateral wall 116 extends along a first side of the first base wall 110. The first lateral wall 116 is attached to the first base wall 110. In this example, the first lateral wall 116 is integral with (e.g., one piece formed) the first base wall 110. In other examples, however, the first lateral wall 116 can be separately attached to the first base wall 110, such as with a joining process (e.g., welding, brazing, etc.), adhesives, fasteners, or the like. While the first lateral wall 116 and the first base wall 110 may initially be substantially planar with respect to each other, as will be described below, the first lateral wall 116 can be bent with respect to the first base wall 110, such that the first lateral wall 116 and the first base wall 110 may be non-planar with respect to each other. The first lateral wall 116 can extend between a first end 118 and a second end 120.

The first support portion 102 comprises a second lateral wall 122. The second lateral wall 122 extends along a second side of the first base wall 110 that is opposite the first side of the first base wall 110. As such, the second lateral wall 122 is positioned on an opposite side of the first base wall 110 from the first lateral wall 116. The second lateral wall 122 is attached to the first base wall 110. In this example, the second lateral wall 122 is integral with (e.g., one piece formed) the first base wall 110. In other examples, however, the second lateral wall 122 can be separately attached to the first base wall 110, such as with a joining process (e.g., welding, brazing, etc.), adhesives, fasteners, or the like. While the second lateral wall 122 and the first base wall 110 may initially be substantially planar with respect to each other, as will be described below, the second lateral wall 122 can be bent with respect to the first base wall 110, such that the second lateral wall 122 and the first base wall 110 may be non-planar with respect to each other. The second lateral wall 122 can extend between a first end 124 and a second end 126. In some examples, the first lateral wall 116 and the second lateral wall 122 are substantially similar with respect to each other.

The second support portion 104 comprises a second base wall 130. The second base wall 130 is an elongated, substantially planar structure that extends between a first end 132 and a second end 134. In some examples, the second base wall 130 comprises one or more openings, projections, or the like to facilitate attachment of the second base wall 130 to another structure. For example, the second base wall 130 may comprise openings (e.g., threaded openings) for receiving one or more screws.

The second base wall 130 is attached to the first base wall 110 of the first support portion 102. In this example, the second base wall 130 is integral with (e.g., one piece formed) the first base wall 110. In other examples, however, the second base wall 130 can be separately attached to the first base wall 110, such as with a joining process (e.g., welding, brazing, etc.), adhesives, fasteners, or the like. In an example, the second end 134 of the second base wall 130 is attached to the first end 112 of the first base wall 110.

The second support portion 104 comprises a first attachment wall 138. The first attachment wall 138 extends along a first side of the second base wall 130. The first attachment wall 138 is attached to the second base wall 130. In this example, the first attachment wall 138 is integral with (e.g., one piece formed) the second base wall 130. In other examples, however, the first attachment wall 138 can be separately attached to the second base wall 130, such as with a joining process (e.g., welding, brazing, etc.), adhesives, fasteners, or the like. While the first attachment wall 138 and the second base wall 130 may initially be substantially planar with respect to each other, as will be described below, the first attachment wall 138 can be bent with respect to the second base wall 130, such that the first attachment wall 138 and the second base wall 130 may be non-planar with respect to each other. The first attachment wall 138 can extend between a first end 140 and a second end 142.

The second support portion 104 comprises a second attachment wall 146. The second attachment wall 146 extends along a second side of the second base wall 130 that is opposite the first side of the second base wall 130. As such, the second attachment wall 146 is positioned on an opposite side of the second base wall 130 from the first attachment wall 138. The second attachment wall 146 is attached to the second base wall 130. In this example, the second attachment wall 146 is integral with (e.g., one piece formed) the second base wall 130. In other examples, however, the second attachment wall 146 can be separately attached to the second base wall 130, such as with a joining process (e.g., welding, brazing, etc.), adhesives, fasteners, or the like. While the second attachment wall 146 and the second base wall 130 may initially be substantially planar with respect to each other, as will be described below, the second attachment wall 146 can be bent with respect to the second base wall 130, such that the second attachment wall 146 and the second base wall 130 may be non-planar with respect to each other. The second attachment wall 146 can extend between a first end 148 and a second end 150. In some examples, the first attachment wall 138 and the second attachment wall 146 are substantially similar with respect to each other.

The third support portion 106 comprises a third base wall 160. The third base wall 160 is an elongated, substantially planar structure that extends between a first end 162 and a second end 164. In some examples, the third base wall 160 comprises one or more openings, projections, or the like to facilitate attachment of the third base wall 160 to another structure. For example, the third base wall 160 may comprise openings (e.g., threaded openings) for receiving one or more screws.

The third base wall 160 is attached to the first base wall 110 of the first support portion 102. In this example, the third base wall 160 is integral with (e.g., one piece formed) the first base wall 110. In other examples, however, the third base wall 160 can be separately attached to the first base wall 110, such as with a joining process (e.g., welding, brazing, etc.), adhesives, fasteners, or the like. The third base wall 160 can extend between the first end 162 and the second end 164, with the first end 162 of the third base wall 160 attached to the second end 114 of the first base wall 110.

The third support portion 106 comprises a third attachment wall 170. The third attachment wall 170 extends along a first side of the third base wall 160. The third attachment wall 170 is attached to the third base wall 160. In this example, the third attachment wall 170 is integral with (e.g., one piece formed) the third base wall 160. In other examples, however, the third attachment wall 170 can be separately attached to the third base wall 160, such as with a joining process (e.g., welding, brazing, etc.), adhesives, fasteners, or the like. While the third attachment wall 170 and the third base wall 160 may initially be substantially planar with respect to each other, as will be described below, the third attachment wall 170 can be bent with respect to the third base wall 160, such that the third attachment wall 170 and the third base wall 160 may be non-planar with respect to each other. The third attachment wall 170 can extend between a first end 172 and a second end 174.

The third support portion 106 comprises a fourth attachment wall 176. The fourth attachment wall 176 extends along a second side of the third base wall 160 that is opposite the first side of the third base wall 160. As such, the fourth attachment wall 176 is positioned on an opposite side of the third base wall 160 from the third attachment wall 170. The fourth attachment wall 176 is attached to the third base wall 160. In this example, the fourth attachment wall 176 is integral with (e.g., one piece formed) the third base wall 160. In other examples, however, the fourth attachment wall 176 can be separately attached to the third base wall 160, such as with a joining process (e.g., welding, brazing, etc.), adhesives, fasteners, or the like. While the fourth attachment wall 176 and the third base wall 160 may initially be substantially planar with respect to each other, as will be described below, the fourth attachment wall 176 can be bent with respect to the third base wall 160, such that the fourth attachment wall 176 and the third base wall 160 may be non-planar with respect to each other. The fourth attachment wall 176 can extend between a first end 178 and a second end 180. In some examples, the third attachment wall 170 and the fourth attachment wall 176 are substantially identical with respect to each other.

In an example, the second support portion 104 and the third support portion 106 can have different lengths. That is, the second support portion 104 may be longer or shorter in length than the third support portion 106. In the illustrated example, the third support portion 106 (e.g., the third base wall 160, the third attachment wall 170, and the fourth attachment wall 176) has a length that is less than a length of the second support portion 104 (e.g., the second base wall 130, the first attachment wall 138 and the fourth attachment wall 146). Due to this difference in size, the solar panel can be supported by the second support portion 104 and the third support portion 106 at an angle with respect to horizontal.

To facilitate bending of one or more walls with respect to other walls, one or more creases may be provided. In an example, crease(s) can be provided between the first base wall 110 and either or both of the first lateral wall 116 and the second lateral wall 122. In another example, crease(s) can be provided between the second base wall 130 and either or both of the first attachment wall 138 and the second attachment wall 146. In yet another examples, crease(s) can be provided between the third base wall 160 and either or both of the third attachment wall 170 and the fourth attachment wall 176. In some examples, crease(s) can be provided between the first base wall 110 and either or both of the second base wall 130 and the third base wall 160. In these examples, the creases represent an area in the support assembly 100 that may be more easily bent than non-creased areas.

Figure 2A:
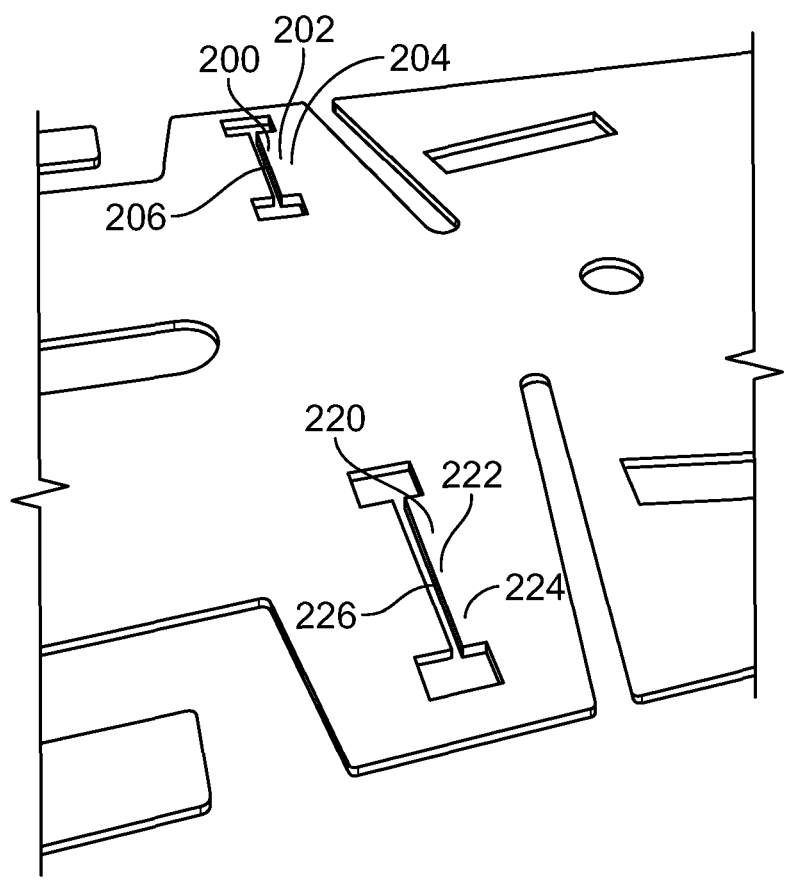
FIG. 2A illustrates a portion of an example support assembly.

FIG. 2A illustrates an enlarged view of a portion of the first support portion 102 and the second support portion 104. The first lateral wall 116 comprises a first attachment structure 200. In an example, the first attachment structure 200 lies within a first attachment structure plane 202. In some examples, the first attachment structure 200 is integral with (e.g., one piece formed) the first lateral wall 116. In other examples, however, the first attachment structure 200 can be separately attached to the first lateral wall 116, such as with a joining process (e.g., welding, brazing, etc.), adhesives, fasteners, or the like.

The first attachment structure 200 extends between a first end 204 and a second end 206. The first end 204 of the first attachment structure 200 is attached to (e.g., integral or non-integral with) the first lateral wall 116. The second end 206 of the first attachment structure 200 is not attached to the first lateral wall 116. In an example, the second end 206 may initially be spaced apart from edges of the first lateral wall 116 that surround the first attachment structure 200. By not being attached to the first lateral wall 116, the second end 206 of the first attachment structure 200 can be bent/moved, thus allowing a position of the first attachment structure 200 with respect to the first lateral wall 116 to be altered.

Referring still to FIG. 2A, the second lateral wall 122 comprises a second attachment structure 220. In an example, the second attachment structure 220 lies within a second attachment structure plane 222. In some examples, the second attachment structure 220 is integral with (e.g., one piece formed) the second lateral wall 122. In other examples, however, the second attachment structure 220 can be separately attached to the second lateral wall 122, such as with a joining process (e.g., welding, brazing, etc.), adhesives, fasteners, or the like.

The second attachment structure 220 extends between a first end 224 and a second end 226. The first end 224 of the second attachment structure 220 is attached to (e.g., integral or non-integral with) the second lateral wall 122. The second end 226 of the second attachment structure 220 is not attached to the second lateral wall 122. In an example, the second end 226 may initially be spaced apart from edges of the second lateral wall 122 that surround the second attachment structure 220. By not being attached to the second lateral wall 122, the second end 226 of the second attachment structure 220 can be bent/moved, thus allowing a position of the second attachment structure 220 with respect to the second lateral wall 122 to be altered.

Figure 2B:
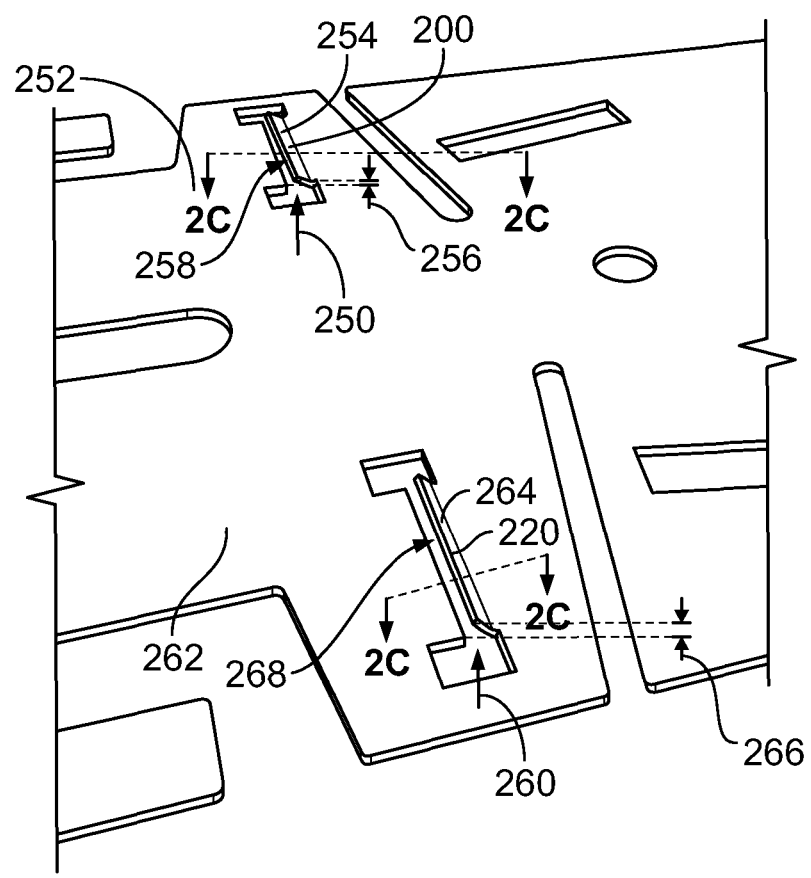
FIG. 2B illustrates a portion of an example support assembly.
Figure 2C:
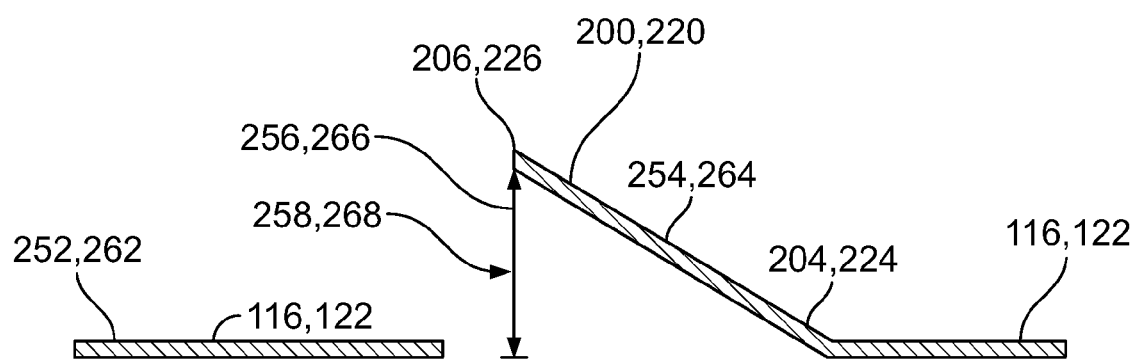
FIG. 2C illustrates a portion of an example support assembly.

Turning to FIGS. 2B and 2C, the first attachment structure 200 can be bent 250 from a first position (illustrated in FIG. 2A), in which the first attachment structure 200 lies within a first lateral plane 252, to a second position (illustrated in FIG. 2B), in which the first attachment structure 200 lies within a first attachment structure plane 254. FIG. 2C illustrates the first attachment structure 200 or the second attachment structure 220 along 2C-2C in FIG. 2B. In an example, the first lateral plane 252 is non-planar with respect to the first attachment structure plane 254. That is, the first attachment structure 200 extends within the first attachment structure plane 254 between the first end 204 and the second end 206, with this first attachment structure plane 254 non-planar with respect to the first lateral plane 252.

The bending 250 of the second end 206 can be accomplished in any number of ways. For example, the bending 250 may occur as a result of a pushing and/or pulling force applied to the second end 206 of the first attachment structure 200. This force can cause the second end 206 to bend in a direction away from the first lateral wall 116. As a result of this bending 250, the second end 206 of the first attachment structure 200 is spaced a first separating distance 256 from the first lateral wall 116 along a direction that is substantially perpendicular to the first lateral plane 252. In this example, the second end 206 of the first attachment structure 200 and the first lateral wall 116 define a channel 258 therebetween, with the channel 258 extending substantially along a length of the first attachment structure 200.

Referring still to FIGS. 2B and 2C, the second attachment structure 220 can be bent 260 from a first position (illustrated in FIG. 2A), in which the second attachment structure 220 lies within a second lateral plane 262, to a second position (illustrated in FIGS. 2B and 2C), in which the second attachment structure 220 lies within a second attachment structure plane 264. In an example, the second lateral plane 262 is non-planar with respect to the second attachment structure plane 264. That is, the second attachment structure 220 extends within the second attachment structure plane 264 between the first end 224 and the second end 226, with this second attachment structure plane 264 non-planar with respect to the second lateral plane 262.

The bending 260 of the second end 226 can be accomplished in any number of ways. For example, the bending 260 may occur as a result of a pushing and/or pulling force applied to the second end 226 of the second attachment structure 220. This force can cause the second end 226 to bend in a direction away from the second lateral wall 122. As a result of this bending 260, the second end 226 of the second attachment structure 220 is spaced a second separating distance 266 from the second lateral wall 122 along a direction that is substantially perpendicular to the second lateral plane 262. In this example, the second end 226 of the second attachment structure 220 and the second lateral wall 122 define a channel 268 therebetween, with the channel 268 extending substantially along a length of the second attachment structure 220.

Figure 3:
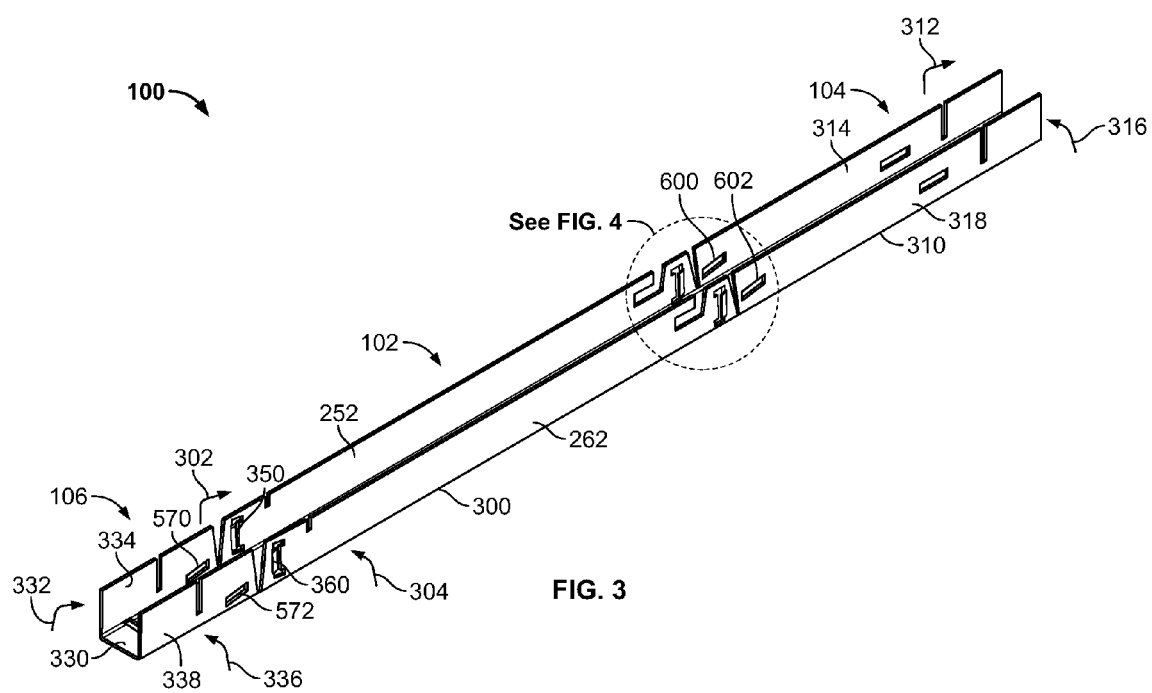
FIG. 3 illustrates an example support assembly.

Turning to FIG. 3, the first base wall 110 lies within a first base plane 300 (e.g., also illustrated in FIG. 1). The first lateral wall 116 can be bent 302 such that the first lateral wall 116 lies within the first lateral plane 252 that is non-planar with respect to the first base plane 300. In an example, the first lateral wall 116 is bent 302 about 90 degrees, such that the first lateral plane 252 extends substantially perpendicularly with respect to the first base plane 300. The second lateral wall 122 can be bent 304 such that the second lateral wall 122 lies within the second lateral plane 262 that is non-planar with respect to the first base plane 300. In an example, the second lateral wall 122 is bent 304 about 90 degrees, such that the second lateral plane 262 extends substantially perpendicularly with respect to the first base plane 300. In some examples, the first lateral plane 252, along which the first lateral wall 116 extends, and the second lateral plane 262, along which the second lateral wall 122 extends, are substantially parallel to each other.

The second base wall 130 lies within a second base plane 310 (e.g., also illustrated in FIG. 1). Initially, as illustrated in FIGS. 1 and 3, the second base plane 310 is parallel to and co-planar with the first base plane 300. In an example, the first attachment wall 138 can be bent 312 such that the first attachment wall 138 lies within a first attachment wall plane 314. In the illustrated example, the first attachment wall 138 is bent 312 about 90 degrees, such that the first attachment wall 138 extends substantially perpendicularly with respect to the second base plane 310. The first attachment wall 138 can extend substantially parallel to the first lateral wall 116, such that the first attachment wall plane 314 and the first lateral plane 252 are substantially parallel and/or co-planar.

The second attachment wall 146 is bent 316 such that the second attachment wall 146 lies within a second attachment wall plane 318 that is non-planar with respect to the second base plane 310. In an example, the second attachment wall 146 is bent 316 about 90 degrees, such that the second attachment wall 146 extends substantially perpendicularly with respect to the second base plane 310. In some examples, the first attachment wall plane 314, along which the first attachment wall 138 extends, and the second attachment wall plane 318, along which the second attachment wall 146 extends, are substantially parallel to each other.

The third base wall 160 lies within a third base plane 330. Initially, as illustrated in FIG. 3, the third base plane 330 is parallel to and co-planar with the first base plane 300 and the second base plane 310. In an example, the third attachment wall 170 can be bent 332 such that the third attachment wall 170 lies within a third attachment wall plane 334. In the illustrated example, the third attachment wall 170 is bent 332 about 90 degrees, such that the third attachment wall 170 extends substantially perpendicularly with respect to the third base plane 330. The third attachment wall 170 can extend substantially parallel to the first lateral wall 116 and/or to the first attachment wall 138, such that the third attachment wall plane 334, the first attachment wall plane 314, and the first lateral plane 252 are substantially parallel and/or co-planar.

The fourth attachment wall 176 is bent 336 such that the fourth attachment wall 176 lies within a fourth attachment wall plane 338 that is non-planar with respect to the third base plane 330. In an example, the fourth attachment wall 176 is bent 336 about 90 degrees, such that the fourth attachment wall 176 extends substantially perpendicularly with respect to the third base plane 330. In some examples, the first attachment wall plane 314, along which the first attachment wall 138 extends, and the second attachment wall plane 318, along which the second attachment wall 146 extends, are substantially parallel to each other.

Referring still to FIG. 3, the first lateral wall 116 comprises a third attachment structure 350 that is integral with the first lateral wall 116. The third attachment structure 350 lies within a third attachment structure plane that is non-planar with respect to the first lateral plane 252 and the first base plane 300. In this example, the third attachment structure 350 is substantially similar to the first attachment structure 200, with the first attachment structure 200 located at the first end 118 of the first lateral wall 116 and the third attachment structure 350 located at the second end 120 of the first lateral wall 116. In this example, the third attachment structure 350 extends between a first end (e.g., the first end 204 illustrated in FIG. 2A) and a second end (e.g., the second end 206 illustrated in FIG. 2A). The second end of the third attachment structure 350 is spaced a first separating distance (e.g., the first separating distance 256 illustrated in FIG. 2B) from the first lateral wall 116 along a direction that is substantially perpendicular to the first lateral plane 252.

The second lateral wall 122 comprises a fourth attachment structure 360 that is integral with the second lateral wall 122. The fourth attachment structure 360 lies within a fourth attachment structure plane that is non-planar with respect to the second lateral plane 262 and the first base plane 300. In this example, the fourth attachment structure 360 is substantially similar to the second attachment structure 220, with the second attachment structure 220 located at the first end 124 of the second lateral wall 122 and the fourth attachment structure 360 located at the second end 126 of the second lateral wall 122. In this example, the fourth attachment structure 360 extends between a first end (e.g., the first end 224 illustrated in FIG. 2A) and a second end (e.g., the second end 226 illustrated in FIG. 2A). The second end of the fourth attachment structure 360 is spaced a second separating distance (e.g., the second separating distance 266 illustrated in FIG. 2B) from the second lateral wall 122 along a direction that is substantially perpendicular to the second lateral plane 262.

Figure 4:
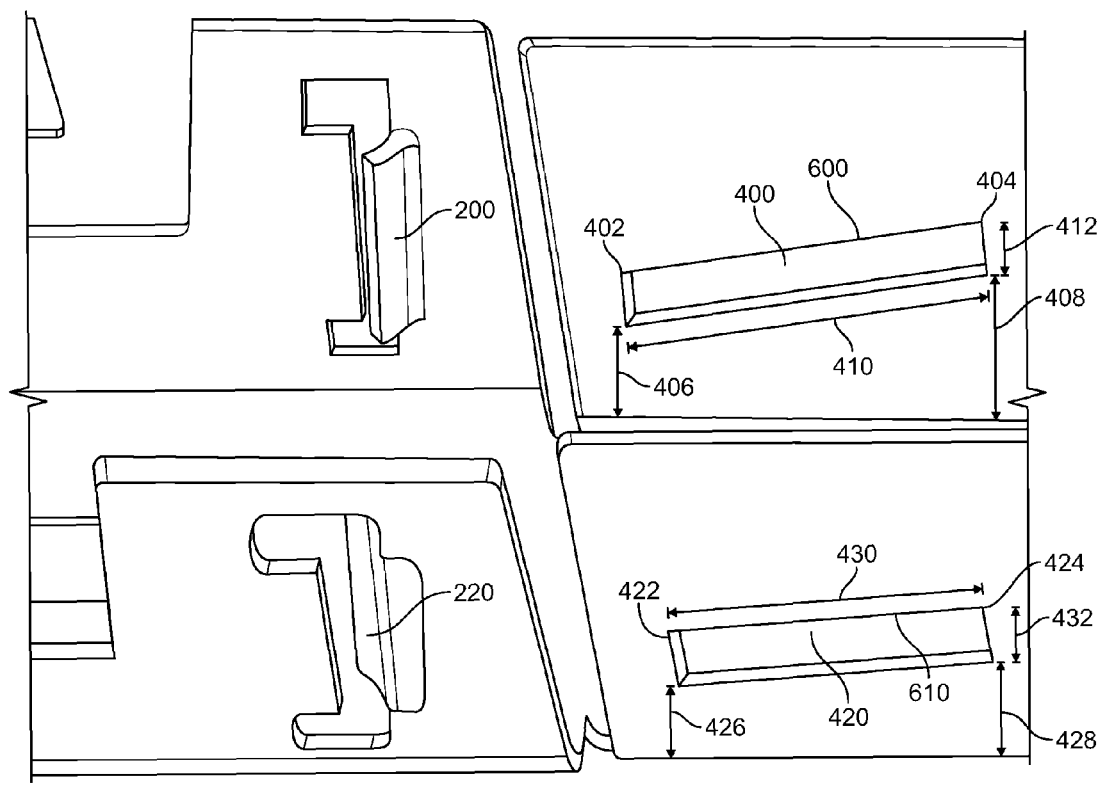
FIG. 4 illustrates a portion of an example support assembly.

FIG. 4 illustrates an enlarged view of the first support portion 102 and the second support portion 104. The first attachment wall 138 defines a first attachment opening 400 into which the first attachment structure 200 is received. As such, the first attachment wall 138 can be attached to the first lateral wall 116. The first attachment opening 400 is disposed at the second end 142 of the first attachment wall 138. The first attachment opening 400 defines a recess, space, aperture, etc. that extends through the first attachment wall 138.

The first attachment opening 400 extends between a first end 402 and a second end 404. In an example, the first end 402 of the first attachment opening 400 is separated a first distance 406 from the second base wall 130. In an example, the second end 404 of the first attachment opening 400 is separated a second distance 408 from the second base wall 130. In some examples, the first distance 406 is less than the second distance 408, such that the first attachment opening 400 extends in a direction away from the second base wall 130 from the first end 402 towards the second end 404. In other examples, however, the first attachment opening 400 is not so limited, and instead could extend substantially parallel to the second base wall 130 (e.g., such that the first distance 406 and the second distance 408 are substantially equal) or in a direction away from the second base wall 130 such that the second distance 408 is less than the first distance 406.

The first attachment opening 400 is elongated and, in an example, has a substantially rectangular shape. In such an example, a length 410 of the first attachment opening 400 between the first end 402 and the second end 404 is greater than a width 412 of the first attachment opening 400. As such, the length 410 of the first attachment opening 400 may be substantially equal to or larger than a length of the first attachment structure 200 such that the first attachment structure 200 can be received within the first attachment opening 400.

The second attachment wall 146 defines a second attachment opening 420 into which the second attachment structure 220 is received. As such, the second attachment wall 146 can be attached to the second lateral wall 122. The second attachment opening 420 is disposed at the second end 150 of the second attachment wall 146. The second attachment opening 420 defines a recess, space, aperture, etc. that extends through the second attachment wall 146.

The second attachment opening 420 extends between a first end 422 and a second end 424. In an example, the first end 422 of the second attachment opening 420 is separated a first distance 426 from the second base wall 130. In an example, the second end 424 of the second attachment opening 420 is separated a second distance 428 from the second base wall 130. In some examples, the first distance 426 is less than the second distance 428, such that the second attachment opening 420 extends in a direction away from the second base wall 130 from the first end 422 towards the second end 424. In other examples, however, the second attachment opening 420 is not so limited, and instead could extend substantially parallel to the second base wall 130 (e.g., such that the first distance 426 and the second distance 428 are substantially equal) or in a direction away from the second base wall 130 such that the second distance 428 is less than the first distance 426.

The second attachment opening 420 is elongated and, in an example, has a substantially rectangular shape. In such an example, a length 430 of the second attachment opening 420 between the first end 422 and the second end 424 is greater than a width 432 of the second attachment opening 420. As such, the length 430 of the second attachment opening 420 may be substantially equal to or larger than a length of the second attachment structure 220 such that the second attachment structure 220 can be received within the second attachment opening 420.

Figure 5:
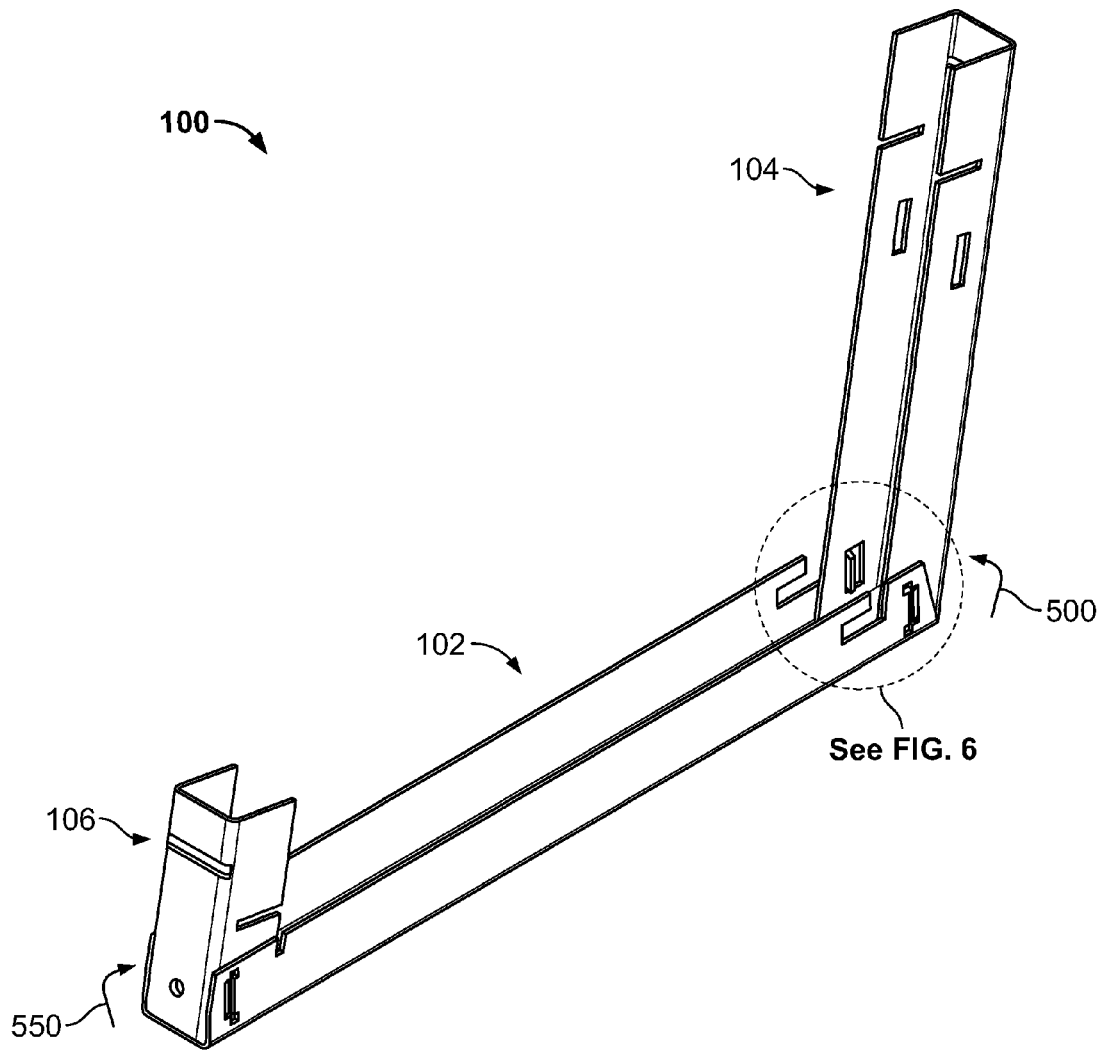
FIG. 5 illustrates an example support assembly.
Figure 6:
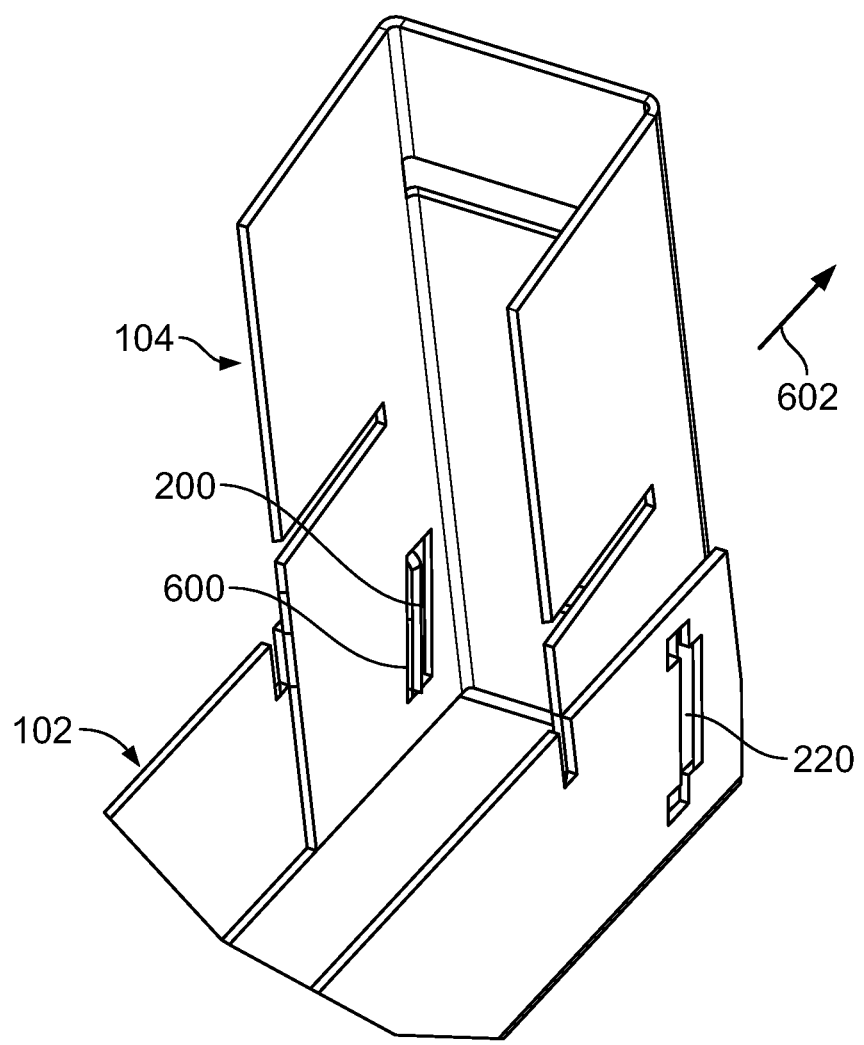
FIG. 6 illustrates a portion of an example support assembly.

Turning to FIGS. 5 and 6, the first support portion 102 and/or the second support portion 104 can be bent 500 from a first position (illustrated in FIG. 3), in which the first support portion 102 and the second support portion 104 are substantially collinear with respect to each other, to a second position (illustrated in FIG. 5), in which the first support portion 102 and the second support portion 104 are non-collinear (e.g., at an angle, not straight, etc.) and non-planar with respect to each other. In this example, the second base wall 130 can be bent 500 with respect to the first base wall 110 such that the second base plane 310 is non-planar with respect to the first base plane 300.

The bending 500 of the second support portion 104 with respect to the first support portion 102 and/or the first support portion 102 with respect to the second support portion 104 can be accomplished in any number of ways. For example, the bending 500 may occur as a result of a pushing and/or pulling force applied to the first support portion 102 and/or to the second support portion 104. As a result of this bending 500, an angle between the first support portion 102 and the second support portion 104 can be in a range of about 45 degrees to about 135 degrees.

The first support portion 102 and/or the third support portion 106 can be bent 550 from a first position (illustrated in FIG. 3), in which the first support portion 102 and the third support portion 106 are substantially collinear with respect to each other, to a second position (illustrated in FIG. 5), in which the first support portion 102 and the third support portion 106 are non-collinear (e.g., at an angle, not straight, etc.) and non-planar with respect to each other. In this example, the third base wall 160 can be bent 550 with respect to the first base wall 110 such that the third base plane 330 is non-planar with respect to the first base plane 300.

The bending 550 of the third support portion 106 with respect to the first support portion 102 and/or the first support portion 102 with respect to the third support portion 106 can be accomplished in any number of ways. For example, the bending 550 may occur as a result of a pushing and/or pulling force applied to the first support portion 102 and/or to the third support portion 106. As a result of this bending 550, an angle between the first support portion 102 and the third support portion 106 can be in a range of about 45 degrees to about 135 degrees.

Due to the bending 500 of the second support portion 104 with respect to the first support portion 102 and/or the first support portion 102 with respect to the second support portion 104, the first lateral wall 116 can be attached to the first attachment wall 138 by altering a relative position between the first lateral wall 116 and the first attachment wall 138. In such an example, the first attachment wall 138 defines the first attachment opening 400, such that the first attachment structure 200 in the second position (e.g., illustrated in FIG. 2B) is received within the first attachment opening 400. For example, as illustrated in FIG. 6, the second end 206 of the first attachment structure 200 can be inserted into and extend through the first attachment opening 400.

Due to the ramped/angled orientation of the first attachment structure 200, the first attachment structure 200 is limited from inadvertently becoming detached/removed from the first attachment opening 400. For example, an opening edge 600 of the first attachment wall 138 is received within the first channel 258 when the second end 206 of the first attachment structure 200 is received within the first attachment opening 400. Movement of the second support portion 104 in a first direction 602 can cause the opening edge 600 to contact/engage the first attachment structure 200, with the opening edge 600 remaining within the first channel 258. As such, inadvertent removal of the first attachment structure 200 from the first attachment opening 400 is limited.

Due to the bending 500 of the second support portion 104 with respect to the first support portion 102 and/or the first support portion 102 with respect to the second support portion 104, the second lateral wall 122 can be attached to the second attachment wall 146 by altering a relative position between the second lateral wall 122 and the second attachment wall 146. In such an example, the second attachment wall 146 defines the second attachment opening 420, such that the second attachment structure 220 in the second position (e.g., illustrated in FIG. 2b) is received within the second attachment opening 420. For example, the second end 226 of the second attachment structure 220 can be inserted into and extend through the second attachment opening 420.

Due to the ramped/angled orientation of the second attachment structure 220, the second attachment structure 220 is limited from inadvertently becoming detached/removed from the second attachment opening 420. For example, an opening edge 610 of the second attachment wall 146 is received within the second channel 268 when the second end 226 of the second attachment structure 220 is received within the second attachment opening 420. Movement of the second support portion 104 in the first direction 602 can cause the opening edge 610 to contact/engage the second attachment structure 220, with the opening edge 610 remaining within the second channel 268. As such, inadvertent removal of the second attachment structure 220 from the second attachment opening 420 is limited.

Referring to FIG. 5, the third attachment wall 170 defines a third attachment opening 570 (e.g., illustrated in FIG. 3). The fourth attachment wall 176 defines a fourth attachment opening 572. The third attachment opening 570 is substantially similar to the first attachment opening 400 while the fourth attachment opening is substantially similar to the second attachment opening 420. The third attachment structure 350 engages the third attachment opening 570 in a similar manner as described with respect to the engagement between the first attachment structure 200 and the first attachment opening 400. For example, the third attachment structure 350 is received into the third attachment opening 570 such that the third attachment wall 170 is attached to the first lateral wall 116.

Due to the bending 550 of the first support portion 102 with respect to the third support portion 106 and/or the third support portion 106 with respect to the first support portion 102, the first lateral wall 116 can be attached to the third attachment wall 170 by altering a relative position between the first lateral wall 116 and the third attachment wall 170. In such an example, the third attachment wall 170 defines the third attachment opening 570 (e.g., illustrated in FIG. 3), such that the third attachment structure 350 in the second position (e.g., illustrated in FIG. 3) is received within the third attachment opening 570. For example, the second end of the third attachment structure 350 can be inserted into and extend through the third attachment opening 570.

Due to the ramped/angled orientation of the third attachment structure 350, the third attachment structure 350 is limited from inadvertently becoming detached/removed from the third attachment opening 570. For example, an opening edge of the third attachment wall 170 may be received within a third channel (e.g., defined between the third attachment structure 350 and the third attachment wall 170) when the third attachment structure 350 is received within the third attachment opening 570. Movement of the third support portion 106 in a second direction 590 can cause the opening edge of the third attachment wall 170 to contact/engage the third attachment structure 350. As such, inadvertent removal of the third attachment structure 350 from the third attachment opening 570 is limited.

Due to the bending 550 of the first support portion 102 with respect to the third support portion 106 and/or the third support portion 106 with respect to the first support portion 102, the second lateral wall 122 can be attached to the fourth attachment wall 176 by altering a relative position between the second lateral wall 122 and the fourth attachment wall 176. In such an example, the fourth attachment wall 176 defines the fourth attachment opening 572 (e.g., illustrated in FIGS. 3 and 6), such that the fourth attachment structure 360 in the second position (e.g., illustrated in FIG. 3) is received within the fourth attachment opening 572. For example, the second end of the fourth attachment structure 360 can be inserted into and extend through the fourth attachment opening 572.

Due to the ramped/angled orientation of the fourth attachment structure 360, the fourth attachment structure 360 is limited from inadvertently becoming detached/removed from the fourth attachment opening 572. For example, an opening edge of the fourth attachment wall 176 may be received within a fourth channel (e.g., defined between the fourth attachment structure 360 and the fourth attachment wall 176) when the fourth attachment structure 360 is received within the fourth attachment opening 572. Movement of the third support portion 106 in the second direction 590 can cause the opening edge of the fourth attachment wall 176 to contact/engage the fourth attachment structure 360. As such, inadvertent removal of the fourth attachment structure 360 from the fourth attachment opening 572 is limited.

Figure 7:
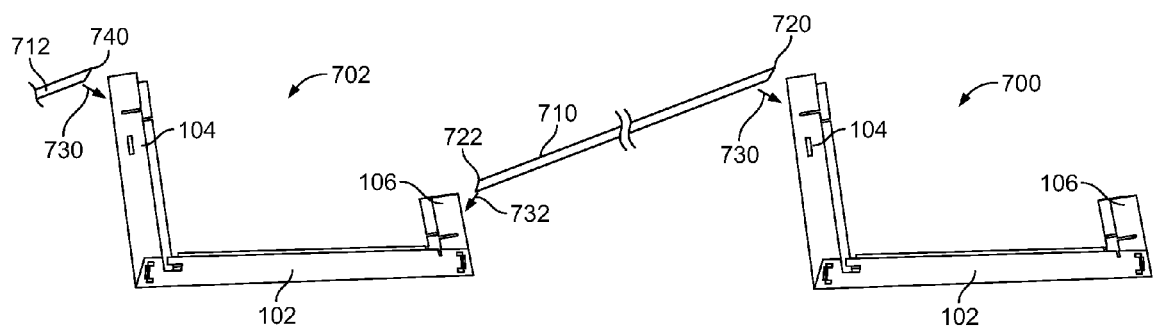
FIG. 7 illustrates an example support assembly for supporting a solar panel.

Turning to FIG. 7, an example of a first support assembly 700 and a second support assembly 702 is illustrated. The first support assembly 700 and the second support assembly 702 are substantially similar to the support assembly 100 illustrated and described with respect to FIGS. 1 to 6. In this example, the first support assembly 700 and/or the second support assembly 702 can support a solar panel. For example, the first support assembly 700 and/or the second support assembly 702 can at least partially support at least one of a solar panel 710, a second solar panel 712, etc.

The solar panel 710 can be attached to the second support portion 104 of the first support assembly 700. For example, a first end 720 of the solar panel 710 can be attached 730

(e.g., illustrated with arrowheads) to the second support portion 104. The first end 720 of the solar panel 710 can be attached 730 to the second support portion 104 in any number of ways, such as with fasteners (e.g., screws, bolts, nuts, etc.), welding/brazing processes, and/or mounting structures (e.g., mounting brackets, etc.), etc.

The first end 720 of the solar panel 710 can be attached to one or more portions of the second support portion 104, such as to the second base wall 130, the first attachment wall 138, the second attachment wall 146, etc. In this example, the weight of the solar panel 710 can initiate a force/movement along the first direction 602 (e.g., illustrated in FIG. 6). However, due to the engagement between the attachment structures of the first support portion 102 and the attachment openings of the second support portion 104, the first end 720 of the solar panel 710 can remain supported by the second support portion 104. A first end 740 of the second solar panel 712 can be attached 730 to the second support assembly 702 in a similar manner as the solar panel 710 is attached to the first support assembly 700.

The solar panel 710 can be attached to the third support portion 104 of the second support assembly 702. For example, a second end 722 of the solar panel 710 can be attached 732 (e.g., illustrated with arrowheads) to the third support portion 106. The second end 722 of the solar panel 710 can be attached 732 to the third support portion 106 in any number of ways, such as with fasteners (e.g., screws, bolts, nuts, etc.), welding/brazing processes, and/or mounting structures (e.g., mounting brackets, etc.), etc. In these examples, the second end 722 of the solar panel 710 can be attached to one or more portions of the third support portion 106, such as to the third base wall 160, the third attachment wall 170, the fourth attachment wall 176, etc. In this example, the weight of the solar panel 710 can initiate a force/movement along the second direction 590 (e.g., illustrated in FIG. 5). However, due to the engagement between the attachment structures of the first support portion 102 and the attachment openings of the third support portion 106, the second end 722 of the solar panel 710 can remain supported by the third support portion 106.

In these examples, the second support portion 104 is attached to the first support portion 102 such that the first support portion 102 and the second support portion 104 can together support the solar panel 710, the second solar panel 712, etc. In such an example, the first support portion 102 may not be directly attached to and/or connected to the solar panel 710. Rather, the first support portion 102 can be attached to the ground, or another structure/surface (e.g., a frame, a roof, etc.). As such, the first support portion 102 can indirectly support (e.g., through the second support portion 104) the solar panel 710.

In a similar manner, the third support portion 106 is attached to the first support portion 102 such that the first support portion 102 and the third support portion 106 can together support the solar panel 710, the second solar panel 712, etc. In such an example, the first support portion 102 can indirectly support (e.g., through the third support portion 106) the solar panel 710, the second solar panel 712, etc.

Figure 8:
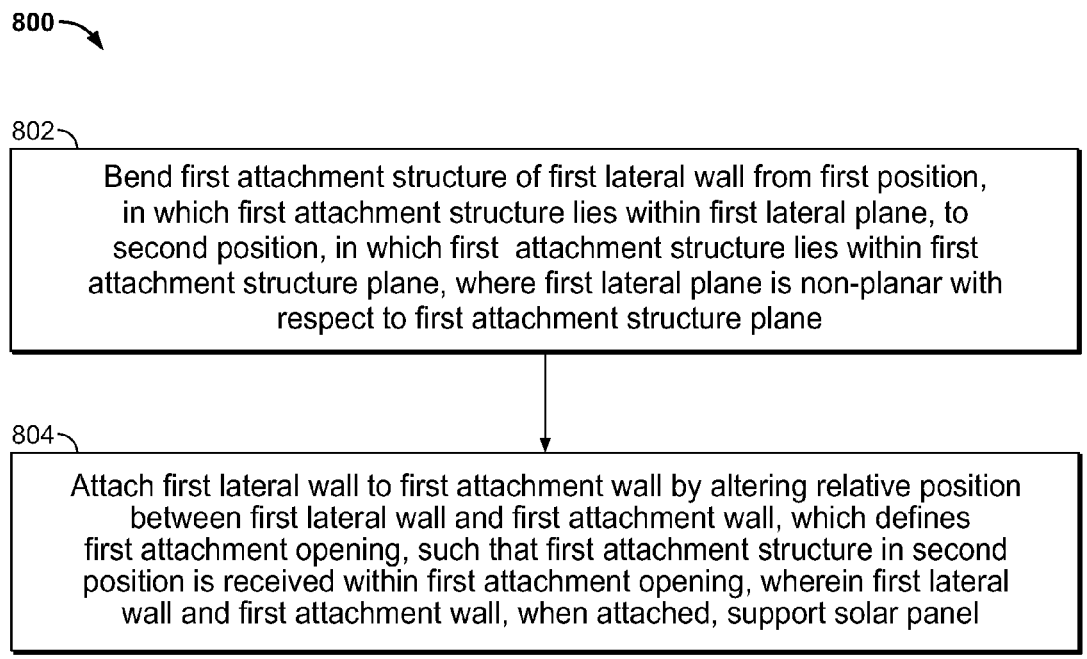
FIG. 8 illustrates an example method of forming a support assembly.

Turning to FIG. 8, an example method 800 of forming a support assembly for supporting a solar panel is provided. The method 800 comprises, at 802, bending the first attachment structure 200 of the first lateral wall 116 from the first position (illustrated in FIG. 2A), in which the first attachment structure 200 lies within the first lateral plane 252, to the second position (illustrated in FIG. 2B), in which the first attachment structure 200 lies within the first attachment structure plane 254, where the first lateral plane 252 is non-planar with respect to the first attachment structure plane 254.

The method 800 comprises, at 804, attaching the first lateral wall 116 to the first attachment wall 138 by altering a relative position between the first lateral wall 116 and the first attachment wall 138. The first attachment wall 138 defines the first attachment opening 400 such that the first attachment structure 200, in the second position, is received within the first attachment opening 400. As such, the first lateral wall 116 and the first attachment wall 138, when attached, support the solar panel 710.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first portion and a second portion generally correspond to portion A and portion B or two different or two identical portions or the same portion.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A support assembly configured to support a solar panel, the support assembly comprising:
 a first support portion comprising:
  a first base wall lying within a first base plane; and a first lateral wall attached to the first base wall, the first lateral wall lying within a first lateral plane that is non-planar with respect to the first base plane, the first lateral wall comprising a first attachment structure that lies within a first attachment structure plane that is non-planar with respect to the first lateral plane and the first base plane; and
a second support portion attached to the first support portion such that the first support portion and the second support portion support the solar panel, the second support portion comprising:
a second base wall lying within a second base plane, the second base wall attached to the first base wall of the first support portion; and
a first attachment wall attached to the second base wall, the first attachment wall lying within a first attachment wall plane that is non-planar with respect to the second base plane, the first attachment wall defining a first attachment opening into which the first attachment structure of the first lateral wall is received such that the first attachment wall is attached to the first lateral wall.

2. The support assembly of claim 1, wherein the first attachment structure is integral with the first lateral wall.

3. The support assembly of claim 1, wherein the second base plane is non-planar with respect to the first base plane.

4. The support assembly of claim 1, wherein the first attachment opening extends between a first end and a second end, the first end of the first attachment opening separated a first distance from the second base wall, the second end of the first attachment opening separated a second distance from the second base wall.

5. The support assembly of claim 4, wherein the second distance is less than the first distance.

6. The support assembly of claim 4, wherein a length of the first attachment opening between the first end and the second end is greater than a width of the first attachment opening.

7. The support assembly of claim 1, the first support portion comprising:
a second lateral wall attached to the first base wall, the second lateral wall lying within a second lateral plane that is non-planar with respect to the first base plane, the second lateral plane substantially parallel to the first lateral plane.

8. The support assembly of claim 7, the second lateral wall comprising a second attachment structure that lies within a second attachment structure plane that is non-planar with respect to the second lateral plane and the first base plane.

9. The support assembly of claim 8, the second support portion comprising a second attachment wall attached to the second base wall, the second attachment wall lying within a second attachment wall plane that is non-planar with respect to the second base plane, the second attachment wall defining a second attachment opening into which the second attachment structure of the second lateral wall is received such that the second attachment wall is attached to the second lateral wall.

10. The support assembly of claim 1, wherein the first lateral wall comprises a third attachment structure that lies within a third attachment structure plane that is non-planar with respect to the first lateral plane and the first base plane.

11. The support assembly of claim 10, comprising a third support portion attached to the first support portion such that the first support portion and the third support portion support at least one of the solar panel or a second solar panel.

12. The support assembly of claim 11, the third support portion comprising:
a third base wall lying within a third base plane, the third base wall attached to the first base wall of the first support portion; and
a third attachment wall attached to the third base wall, the third attachment wall lying within a third attachment wall plane that is non-planar with respect to the third base plane, the third attachment wall defining a third attachment opening into which the third attachment structure of the first lateral wall is received such that the third attachment wall is attached to the first lateral wall.

13. A support assembly configured to support a solar panel, the support assembly comprising:
a first support portion comprising:
a first base wall; and
a first lateral wall attached to the first base wall, the first lateral wall lying within a first lateral plane and comprising a first attachment structure that projects outwardly from the first lateral wall, a first end of the first attachment structure attached to the first lateral wall, a second end of the first attachment structure not attached to the first lateral wall, the second end of the first attachment structure spaced a distance from the first lateral wall along a direction that is substantially perpendicular to the first lateral plane; and
a second support portion attached to the first support portion such that the first support portion and the second support portion support the solar panel, the second support portion comprising:
a second base wall attached to the first base wall of the first support portion; and
a first attachment wall attached to the second base wall, the first attachment wall defining a first attachment opening into which the second end of the first attachment structure of the first lateral wall is received such that the first attachment wall is attached to the first lateral wall.

14. The support assembly of claim 13, wherein the solar panel is attached to the second support portion.

15. The support assembly of claim 13, wherein the first attachment wall lies within a first attachment wall plane, the first attachment wall plane substantially parallel to the first lateral plane of the first lateral wall.

16. The support assembly of claim 13, wherein the first base wall lies within a first base plane and the second base wall lies within a second base plane, and wherein the second base plane is non-planar with respect to the first base plane.

17. The support assembly of claim 13, wherein the second end of the first attachment structure and the first lateral wall define a channel, an opening edge of the first attachment wall received within the channel when the second end of the first attachment structure is received within the first attachment opening.

18. A method of forming a support assembly for supporting a solar panel, the method comprising:
bending a first attachment structure of a first lateral wall from a first position, in which the first attachment structure lies within a first lateral plane, to a second position, in which the first attachment structure lies within a first attachment structure plane, where the first lateral plane is non-planar with respect to the first attachment structure plane; and
attaching the first lateral wall to a first attachment wall by altering a relative position between the first lateral wall and the first attachment wall, which defines a first attachment opening, such that the first attachment structure in the second position is received within the first attachment opening, wherein the first lateral wall and the first attachment wall, when attached, support the solar panel.

19. The method of claim 18, wherein bending a first attachment structure comprises bending the first attachment structure such that a first end of the first attachment structure is attached to the first lateral wall and a second end of the first attachment structure is not attached to the first lateral wall.

20. The method of claim 19, wherein bending a first attachment structure comprises bending the first attachment structure such that the second end of the first attachment structure is spaced a distance from the first lateral wall along a direction that is substantially perpendicular to the first lateral plane.

* * * * *